(12) United States Patent
Ture et al.

(10) Patent No.: US 8,795,471 B2
(45) Date of Patent: Aug. 5, 2014

(54) COMPOSITE INTERMEDIATE, METHOD FOR FORMING SAME, AND USE OF THE COMPOSITE INTERMEDIATE

(75) Inventors: Timo Ture, Tampere (FI); Eeva Hanni, Espoo (FI); Jouni Paltakari, Espoo (FI); Kari Luukko, Espoo (FI); Kaisa Herranen, Pirkkala (FI); Harri Kosonen, Lappeenranta (FI); Markku Nikkila, Tampere (FI)

(73) Assignee: Elastopoli Oy, Sastamala (FI)

( * ) Notice: Subject to any disclaimer, the term of this patent is extended or adjusted under 35 U.S.C. 154(b) by 133 days.

(21) Appl. No.: 13/265,350

(22) PCT Filed: Apr. 20, 2010

(86) PCT No.: PCT/FI2010/050320
§ 371 (c)(1),
(2), (4) Date: Jan. 5, 2012

(87) PCT Pub. No.: WO2010/122224
PCT Pub. Date: Oct. 28, 2010

(65) Prior Publication Data
US 2012/0090800 A1   Apr. 19, 2012

(30) Foreign Application Priority Data
Apr. 20, 2009   (FI) .................................. 20095428

(51) Int. Cl.
*D21H 17/34*   (2006.01)
*D21H 21/50*   (2006.01)
*D21H 25/04*   (2006.01)

(52) U.S. Cl.
USPC ........ 162/169; 162/158; 162/168.1; 162/175; 162/181.1; 428/221; 428/327; 428/357; 428/402

(58) Field of Classification Search
USPC ...................... 428/221, 292.1, 323, 327, 357, 428/402–2.24; 162/158, 164.1, 175, 181.1, 162/168.1, 169
See application file for complete search history.

(56) References Cited

U.S. PATENT DOCUMENTS 3,257,267 A * 6/1966 Hay .............................. 162/159
3,941,634 A   3/1976 Nisser et al.
(Continued)

FOREIGN PATENT DOCUMENTS

DE   23 56 738   5/1975
EP   0 665 316   8/1995
(Continued)

OTHER PUBLICATIONS

"Compatible", definition in The Free Dictionary by FARLEX, 2013, [online], retrieved Nov. 27, 2013, [retrieved from the Internet] <URL: http://www.oxforddictionaries.com/us/definition/american_english/Compatibility>.*

(Continued)

*Primary Examiner* — Dennis Cordray
(74) *Attorney, Agent, or Firm* — Venable LLP; Eric J. Franklin

(57) ABSTRACT

A web-type composite intermediate is formed from fibers and plastic. The composite intermediate is formed by wet web formation from a substantially homogeneous liquid mixture which contains natural fibers, plastic particles having a diameter of less than approximately 1000 μm, and an agent that improves compatibility between natural fibers and plastic particles. In addition, a method for forming a composite intermediate and the use of the composite intermediate are also described.

16 Claims, 1 Drawing Sheet

(56) References Cited

U.S. PATENT DOCUMENTS

| | | | |
|---|---|---|---|
| 4,304,626 | A | 12/1981 | Shaw et al. |
| 4,716,062 | A | 12/1987 | Klein |
| 4,769,109 | A | 9/1988 | Tellvik et al. |
| 5,393,379 | A | 2/1995 | Parrinello |
| 5,468,437 | A * | 11/1995 | Hall .................. 264/119 |
| 7,803,249 | B2 * | 9/2010 | Dyer et al. ................ 162/168.1 |
| 8,382,945 | B2 * | 2/2013 | Hong et al. .................. 162/103 |
| 8,388,808 | B2 * | 3/2013 | Heijnesson-Hulten et al. .......................... 162/164.1 |
| 2002/0096282 | A1 | 7/2002 | Leibler |
| 2004/0250972 | A1 * | 12/2004 | Carr .......................... 162/164.1 |
| 2008/0145637 | A1 * | 6/2008 | Frank ........................ 428/292.4 |
| 2008/0295985 | A1 * | 12/2008 | Moncla et al. ............. 162/157.6 |

FOREIGN PATENT DOCUMENTS

| | | |
|---|---|---|
| GB | 1 118 221 | 6/1968 |
| GB | 1597369 | 9/1981 |
| WO | 02/055788 | 7/2002 |
| WO | 03/052206 | 6/2003 |
| WO | 2007078537 | 7/2007 |
| WO | 2009/008822 | 1/2009 |
| WO | WO 2009153225 A1 * | 12/2009 ............. D21H 17/24 |

OTHER PUBLICATIONS

"Adhesion", definition in the Free Dictionary by FARLEX, 2013, [online], retrieved Dec. 2, 2013, [retrieved from the Internet] <URL: http://www.oxforddictionaries.com/us/definition/american_english/adhesion>.*

H.L. Bos, et al.; "Mechanical Properties of Short-Flax-Fibre Reinforced Compounds"; Composites: Part A, vol. 37 (2006) 1591-1604.

M.J.A. Van Den Oever, et al.; "Influence of the Physical Structure of Flax Fibres on the Mechanical Properties of Flax Fibre Reinforced Polypropylene Composites"; Applied Composite Materials, vol. 7 (2000) 387-402.

International Search Report dated Aug. 2, 2010, corresponding to PCT/FI2010/050320.

Finnish Search Report dated Jan. 12, 2010, corresponding to foreign priority application No. 20095428.

* cited by examiner

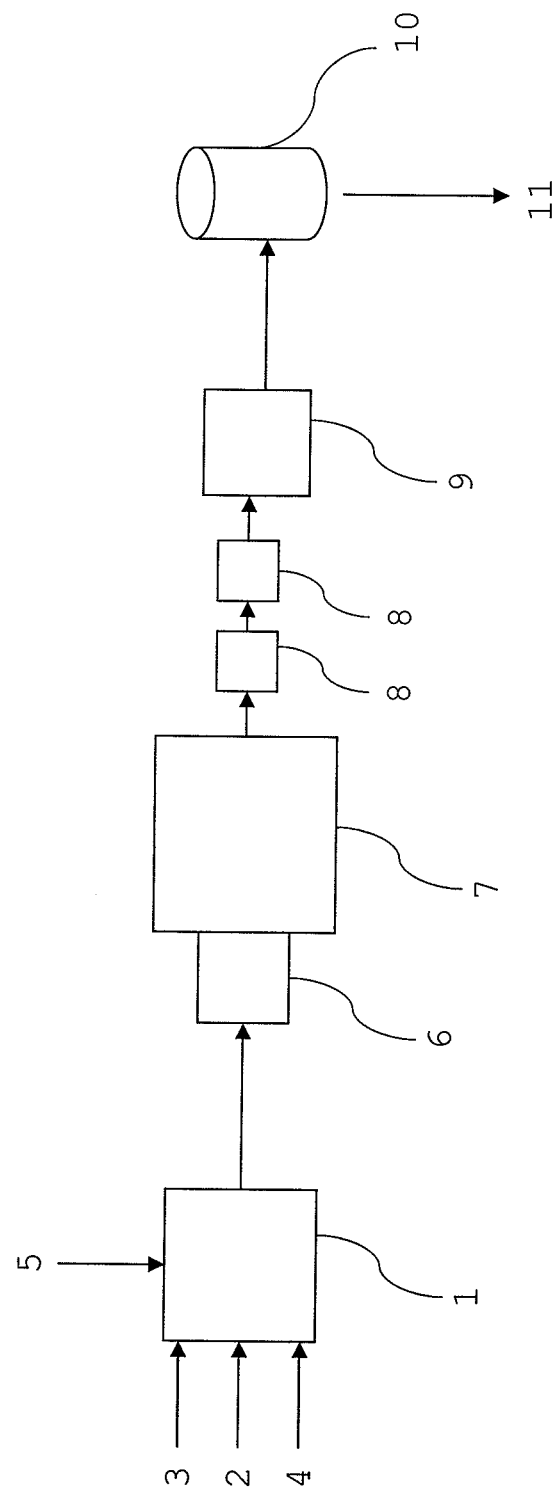

COMPOSITE INTERMEDIATE, METHOD FOR FORMING SAME, AND USE OF THE COMPOSITE INTERMEDIATE

This application is a 371 of PCT/FI10/50320, filed Apr. 20, 2010 and claims priority to Finnish Application No. 20095428, filed Apr. 20, 2009.

FIELD OF THE INVENTION

The invention relates to a composite intermediate, to a method for forming a composite intermediate, and to a use of the composite intermediate in the manufacture of an end product.

BACKGROUND OF THE INVENTION

New wood-based products have been developed alongside with traditional products of the forest industry. For example, different wood composite products in which wood-based materials are combined with plastic-based materials are known. Wood composites can be used for example in the building industry and in furniture applications. It has been known to manufacture wood composite products mainly by extrusion or injection molding.

In addition, different methods and apparatuses are known in the field of forest industry to manufacture a web, e.g. to manufacture a paper web or a chemical pulp web, and to dry it. It is known to form the web e.g. by wet web formation in which raw materials are formed into a liquid suspension which is led as an even layer from a headbox or the equivalent to a web forming section, e.g. a wire. Thereafter, water is removed from the web e.g. by pressing and/or drying by heat.

Known wood or natural fiber-based plastic mixtures have been manufactured by melt-mixing them together, typically utilizing the extrusion method. In these processes, plastic, dry wood or natural fiber material and compatibility-improving agents are mixed together at a high temperature in which the plastic materials are in the molten state. However, the dry wood and natural fiber materials, when dry, are strongly hydrogen bonded, and these bonds cannot be opened in the process. Consequently, the effect of the compatibilizing agents remains low, and in further processing the products have a strong tendency to reagglomerate.

Reference GB 1597369 discloses the preparation of a composite material from cellulose fibers and a polymer material in an aqueous suspension in the presence of a synthetic polymeric polyelectrolyte flocculating agent. As many hydrogen bonds as possible are tried to be formed between cellulose fibers to strengthen the cellulose network. The inert character of plastic particles is considered an advantage, whereupon the plastic particles do not interfere with hydrogen bonds which are developing between cellulose fibers. The resultant material is dried.

Reference WO 2009/008822 discloses the preparation of a composite material by a wet method so that a mixture of a lignocellulosic material and a thermoplastic material is formed, the mixture is led on a wet web to form a composite material, and the composite material is hot-pressed. The components are not chemically bound together.

Problems in the manufacture of known wood composite products include thermal stress on the fibers, breaking of the fibers, and reagglomeration of the fibers during the manufacturing process or further processing, whereupon the properties of the composite product, such as the mechanical properties and strength properties, are deteriorated. In later researches in the field it has been detected that the strong formation of hydrogen bonds between cellulose fibers causes reagglomeration of the cellulose fibers in further processes, which causes in products fiber bundles which clearly weaken the mechanical properties of the end product. Other problems include the undesirable odor and limited color options of the products, especially in connection with products containing lignin or hemicellulose.

Another problem in the manufacture of known wood composite products has been the lower production capacity compared with the manufacture of pure plastic products.

OBJECTIVE OF THE INVENTION

The objective of the invention is to disclose a new type of a web-type composite intermediate which can be utilized in the manufacture of a composite end product. Another objective of the invention is to disclose a method to form a composite web.

SUMMARY OF THE INVENTION

Embodiments of the composite intermediate, method for manufacturing it, and use of the composite intermediate according to the invention are described herein.

The invention is based on a web-type composite intermediate which is formed from natural fibers and plastic. According to the invention, the composite intermediate is formed by wet web formation from a substantially homogeneous liquid mixture which contains natural fibers, plastic particles having a diameter of less than approximately 1000 μm, and an agent that improves compatibility between natural fibers and plastic particles. Liquid is removed from the web formed in connection with wet web formation. The homogeneous compatibilization of the web, i.e. the improved compatibility between natural fibers and plastic, prevents formation of hydrogen bonds in excessive amounts between natural fibers and provides a strong and homogeneous structure for the composite intermediate. The compatibilization-improving agent and small plastic particles are obtained evenly in the gaps of the natural fiber network by wet web formation, whereupon the coupling agents are active and the adhesion between natural fibers and plastic particles lasts in further processing of the intermediate e.g. when heat is added in the manufacture of an end product.

In addition, the invention is based on a method for forming a web-type composite intermediate from natural fibers and plastic. According to the invention, a liquid substantially homogeneous mixture which contains natural fibers, plastic particles having a diameter of less than approximately 1000 μm and an agent that improves compatibility between natural fibers and plastic particles is formed, the mixture is spread as an even layer on a web forming section, a web-type composite intermediate is formed from the mixture by wet web formation, and liquid is removed from the resulting web.

In addition, the invention is based on the use of the web-type composite intermediate so that the web-type composite intermediate is used in the manufacture of an end product formed by pressing, compression molding, injection molding, extrusion, thermoforming, blow molding and/or rotational molding. The end product may be formed by any suitable method known per se or by their combination, e.g. by plastic machining methods.

The invention is specifically based on a new type of a biocomposite intermediate and on the formation of a composite intermediate, utilizing technical know-how and methods of the paper technology, such as wet web formation. Furthermore, the invention is based on the formation of a composite intermediate having good mechanical properties, wherein the formation of hydrogen bonds between fibers is reduced. In addition, the invention is based on utilization of the composite intermediate in further processing and in the manufacture of a composite end product.

In this context, by a web is meant any natural fiber-based web or a web-type structure which also contains plastic-based material. As the natural fiber-based material, the web may contain wood fibers, botanical fibers and/or their derivatives or their mixtures. The web may contain suitable fillers and additives. In addition, the web may contain other fiber- or polymer-based substances.

In one embodiment of the invention, the natural fiber is selected from the group of wood-derived fibers, botanical fibers and their derivatives and their mixtures. In one embodiment, the natural fiber may be a recycled fiber or a secondary fiber. In one embodiment, the natural fiber is selected from the group of wood, sisal, jute, hemp, flax, cotton, straw and other annual plant fiber and their mixtures. In one embodiment, the natural fiber may be a mechanically defibrated fiber, dissolving pulp fiber, sulphite pulp fiber, sulphate pulp fiber or viscose fiber. In one embodiment, the natural fiber is a chemical pulp fiber. In one embodiment, the amount of natural fibers in the dry composite intermediate is 10 to 90 w-%, preferably 40 to 70 w-%. In one embodiment, the amount of natural fibers in the dry composite intermediate may be even 90 w-%.

In one embodiment, the natural fibers contain cellulose. In one embodiment of the invention, cellulose fibers are used as the natural fibers. In one embodiment, the natural fibers mainly consist of cellulose fibers. In one embodiment of the invention, pure cellulose fiber is used. The cellulose fibers provide a strong structure to the composite product. In one embodiment, at least part of the natural fibers are microfibrillated cellulose fibers and/or cellulose nanofibers. In one embodiment, most of the natural fibers are micro- or nanosize cellulose fibers. In using cellulose nanofibers, an even nanonetwork is provided in the end product or on its surface to improve the strength of the product. A 3D nanonetwork is formed when liquid is removed from the web, i.e. when the web is drying.

In one embodiment of the invention, at least part of the natural fibers is lignin-free and preferably hemicellulose-free. Lignin and hemicelluloses have a weakening effect on the mechanical properties of both the intermediate and the end product. In addition, they produce a bad odor as well as fading and changing of colors in intermediate and end products. By using lignin-free natural fibers, coloring agents can be used in the manufacture of the web, which color lasts in the product. In one embodiment, at least part of the natural fibers is delignified.

In one embodiment of the invention, the plastic is a thermosoftening plastic, preferably a thermoplastic. In one embodiment, the plastic is selected from the group of polyethylene (PE), polypropylene (PP), ethylene/propylene copolymer, polycarbonate (PC), polystyrene (PS), polyethylene terephthalate (PET), polylactic acid (PLA), polyhydroxybutylate, acrylonitrile/butadiene/styrene copolymer (ABS), styrene/acrylonitrile copolymer (SAN), polyoxymethylene (POM), biodegradable thermoplastics, starch-based thermoplastics, their derivatives and their mixtures. Alternatively, any plastic suitable for the purpose may be used.

In one embodiment, the amount of plastic in the dry composite intermediate is 10 to 90 w-%, preferably 30 to 60 w-%. The plastic is preferably provided in the form of powdery particles, e.g. in the form of microgranulates or powder. The diameter of plastic particles is less than approximately 1000 μm, more preferably less than approximately 500 μm. The small plastic particles migrate between fibers, reinforcing the structure of the resulting composite intermediate and thereby of the end product. In addition, a plastic material formed by small-scale particles has a bigger specific surface. Preferably, the plastic particles may be of any shape, e.g. cubic, elliptic, fibrous or flaky.

In one embodiment of the invention, the liquid mixture is a water-based mixture which contains water, natural fibers, plastic particles and a compatibility-improving agent. In one embodiment, the mixture is in the form of a solution, dispersion, suspension or the equivalent.

In one embodiment of the invention, the compatibility-improving agent is an agent that increases adhesion between plastic and natural fibers and is compatible and/or reactive with reactive groups of plastic and natural fibers. In one embodiment, the compatibility-improving agent includes at least one reactive group which is compatible and/or reactive with reactive groups of cellulose which is a hydrophilic agent and of a polymer which is a hydrophobic agent. In one embodiment, the compatibility-improving agent is selected from the group of maleic anhydrides, maleic acid grafted polymers, polybutadienes, polymethyl-methacrylates (PMMA), EVA, their derivatives and their mixtures. In one embodiment, the compatibility-improving polymers are copolymers with groups which contain groups that are compatible and/or reactive with hydrophilic natural fibers as well as groups that are compatible and/or reactive with hydrophobic plastics. Other molecules which have similar properties may also be used for compatibilization. In one embodiment, the compatibility-improving agent is in the powdery, liquid and/or polymeric form. In one embodiment, the compatibility-improving agent is present in an amount of less than 5 w-%, in one embodiment less than 3 w-% of the dry matter.

In one embodiment of the invention, the agent that improves compatibility between natural fibers and plastic particles is added to the liquid mixture. In one embodiment, the plastic particles contain the agent that improves compatibility between natural fibers and plastic particles.

In one embodiment of the invention, the composite intermediate contains at least one additive selected from the group of starch, fillers, surface-active agents, retention agents, dispersing agents, anti-foam agents and their mixtures. All necessary substances can be added to the composite intermediate according to the invention in connection with web formation, e.g. by adding the substances to the liquid mixture. In this case, the composite intermediate contains the necessary substances in the possible further processing applications and end product applications as well.

In one embodiment of the invention, liquid is removed from the web by pressing and/or drying. The drying and/or pressing may be carried out in manners known per se in the field of the manufacture of a paper web or a chemical pulp web. Alternatively, the drying and/or pressing may be carried out by any suitable manner. Any device components known per se in the art may be used as the drying device and pressing device.

In a preferred embodiment, the bonds between natural fibers and plastic particles are tightened after removing the liquid or drying, thanks to the compatibility-improving agent.

In one embodiment, the natural fibers are modified. In one embodiment, the modification of natural fibers is carried out before formation of the liquid mixture. In one embodiment, the natural fibers are modified in connection with web formation. In one embodiment in which the natural fibers are chemical pulp fibers they are modified so that OH groups of the chemical pulp fibers are modified chemically, whereupon their compatibility to different plastic materials is improved.

In one embodiment of the invention, the natural fibers are ground before forming the liquid mixture. The grinding opens e.g. the chemical pulp fiber, whereupon the compatibility-improving agent is able to penetrate in the fiber structure and the chemical pulp fiber forms more bonds in the direction of plastic than a crude chemical pulp fiber. In this case, the strength of the formed intermediate is improved and the reagglomeration of fibers in the possible further processing diminishes.

In one embodiment of the invention, the resulting web is treated with heat to melt the plastic particles at least partially and in this way to connect natural fibers and plastic particles more tightly with each other. It is not necessary to carry out a heat treatment in the intermediate manufacturing step in all embodiments of the invention.

Any device known per se in the art, e.g. a paper or chemical pulp web production device, may be used as the web production device.

In one embodiment of the invention, the resulting web is crushed and the composite end product is formed from the crushing product either directly or via an intermediate step. In one embodiment, agglomerates or granulates which are used in the manufacture of the composite end product are formed from the crushing product.

In one embodiment of use of the invention, the web-type composite intermediate is provided in the form of a sheet, roll, compression preform, crushing product, agglomerates and/or granulates. In this context, by a compression preform is meant e.g. a raw material preform used in compression molding, i.e. a preformed product. The intermediate web may be provided in the form of a crushing product, granulates or agglomerates e.g. for injection molding or extrusion. Alternatively, the resulting composite intermediate web may be used as such, in the form of a sheet or in the rolled-up form in the manufacture of the end product.

The composite intermediate according to the invention may be manufactured and utilized in both batch- and continuously operated processes.

The composite intermediate according to the invention may be utilized in the vehicle industry, e.g. in the manufacture of interior elements of a car or other vehicles, in the furniture industry, packaging industry, vessels, exterior structures, e.g. granaries and patios, in the manufacture of acoustic elements and in the equivalent locations.

Important advantages are achieved by the product and the method according to the invention as compared with the prior art.

By the invention, new and desirable properties such as strength properties and resistance to weather are provided in composite products, both intermediates and end products. Thanks to powdery plastic particles and the liquid mixture, a homogeneous mix and improved compatibility between plastic particles and natural fibers are provided. In addition, the compatibilizing agent improves compatibility and adhesion between plastic and natural fiber. Also, the reagglomeration of natural fibers is diminished in further processing of the composite intermediate. Thanks to the wet process, the plastic particles and the compatibility-improving agent migrate better between natural fibers before networking and agglomeration of the fibers. In the invention, it is important that hydrogen bonds are not developed in excessive amounts between natural fibers, but instead the bonds are developed between natural fibers and plastic particles. In the wet process according to the invention, the hydrogen bonds between natural fibers are open in the water suspension, and the bonds can be formed between plastic and natural fiber by compatibilizing agents.

Thanks to the invention, the manufacture of a composite intermediate as well as a composite end product can be improved and enhanced. The wet web formation is not mechanically wearing, e.g. it does not cause contraction of fibers, and high temperatures do not have to be used to form the composite intermediate.

By using lignin-free natural fibers in the mixture, products which do not produce bad odor can be manufactured. In this case, it is also possible to manufacture colored products.

Thanks to the invention, a very good environmentally friendly and recyclable composite intermediate and composite end product which can be e.g. injection molded again or converted to energy by burning are provided.

Thanks to the invention, good mechanical properties are provided in products processed further from the composite intermediate. The end products formed from the composite intermediate according to the invention are light and thereby suited to various purposes of use.

By the invention, an industrially applicable easy and useful solution is achieved for the manufacture of a composite intermediate e.g. without a compulsory treatment step carried out at a high temperature, e.g. a hot-pressing step.

LIST OF FIGURES

FIG. 1 presents a simplified diagram of one apparatus by which the composite intermediate according to the invention can be formed.

DETAILED DESCRIPTION OF THE INVENTION

In the following, the invention will be described using a detailed example of an embodiment with reference to the accompanying drawing.

The apparatus according to FIG. 1 includes a mixing tank 1 to form a liquid mixture. The mixing tank 1 includes feeding means to add natural fiber 2, plastic 3, liquid 4 and a compatibilizing agent, i.e. an adhesion agent 5, to the tank. In addition, the mixing tank includes mixing means (not shown in the FIGURE) to mix the liquid mixture. Furthermore, the apparatus includes a fourdrinier machine with the headbox 6 and the wire section 7 to form a web from the liquid mixture. In addition, the apparatus includes two presses 8 and a drying section 9 to dry the resulting web. The device components used in the apparatus are completely known per se in the field of papermaking and are not described in more detail herein.

In this example, a composite web was formed by the apparatus according to FIG. 1 from lignin-free chemical pulp fibers and plastic particles having a diameter of less than 500 μm.

The chemical pulp fibers were ground by a grinder to an SR value of 21.5 before formation of the liquid mixture. The liquid mixture with cellulose fibers in an amount of approximately 40 w-% of the dry matter, thermoplastic polystyrene in an amount of approximately 57 w-% of the dry matter, and an SMA (Styrene Maleic Anhydride) adhesion agent in an amount of 2.5 w-% of the dry matter was formed. The rest, approximately 0.5 w-%, included conventionally used additives and fillers. First, water was added to cellulose fibers to form the liquid mixture having a final consistency of approximately 2.2 to 2.3%. Next, the SMA adhesion agent as well as the desired additives and fillers were added to the liquid mixture. Finally, the polystryrene microparticles were added to the liquid mixture, whereafter the mixture was stirred overnight.

Before web formation, the liquid mixture was diluted to a headbox consistency. The mixture was led to the headbox 6 and formed into a web at the wire section 7. The web was dried by presses 8 and the drying section 9. After drying, the web-type product was provided in the form of a roll 10.

In further processing 11, the composite intermediate web was crushed and formed into granulates. The intermediate granulates were led to injection molding where the granulates were processed further into the desired end products, e.g. for the use of the car industry.

The method according to the invention is suited in different embodiments for use in the manufacture of most different composite webs. The composite intermediate according to the invention is suited in different embodiments for use in most different purposes.

The invention is not limited merely to the examples referred to above; instead, many variations are possible within the scope of the inventive idea defined by the claims.

The invention claimed is:

1. A composite intermediate which is formed from fibers and plastic, the composite intermediate being formed by wet web formation from a substantially homogeneous liquid mixture comprising:
    natural fibers selected from the group consisting of wood-derived fibers, mechanically defibrated fibers, chemical pulp fibers, cellulose fibers of natural fibers, and mixtures thereof,
    thermosoftening plastic particles having a diameter of less than approximately 1000 µm, and
    an agent that improves compatibility between the natural fibers and plastic particles, said agent increasing adhesion between the natural fibers and the plastic particles and being compatible with reactive groups of the natural fibers and plastic particles, wherein the agent that improves compatibility is styrene maleic anhydride, and wherein the liquid mixture comprises less than 3 wt % dry matter of the agent.

2. The composite intermediate according to claim 1, wherein at least part of the natural fibers is lignin-free.

3. The composite intermediate according to claim 1, wherein the natural fibers comprise microfibrillated cellulose fibers, cellulose nanofibers or mixtures thereof.

4. The composite intermediate according to claim 1, wherein the plastic is a thermoplastic.

5. The composite intermediate according to claim 1, wherein the diameter of plastic particles is less than approximately 500 µm.

6. The composite intermediate according to claim 1, wherein the liquid mixture is a water-based mixture.

7. The composite intermediate according to claim 1, wherein the composite intermediate further comprises at least one additive selected from the group consisting of starch, fillers, surface-active agents, retention agents, dispersing agents, anti-foam agents and mixtures thereof.

8. A method for forming a composite intermediate from fibers and plastic, comprising:
    providing a substantially homogeneous liquid mixture which comprising natural fibers, thermosoftening plastic particles having a diameter of less than approximately 1000 µm, and an agent that improves compatibility between natural fibers and plastic particles, wherein the plastic particles contain the agent that improves the compatibility between the natural fibers and the plastic particles,
    spreading the mixture as an even layer on a web forming section,
    forming a web-type composite intermediate from the mixture by wet web formation, and
    removing liquid from the resulting web,
    wherein the natural fibers are selected from the group consisting of wood-derived fibers, mechanically defibrated fibers, chemical pulp fibers, cellulose fibers of natural fibers, and mixtures thereof, and the agent is compatible with reactive groups of the natural fibers and plastic particles.

9. The method according to claim 8, wherein the agent that improves compatibility between the natural fibers and the plastic particles is added to the liquid mixture.

10. The method according to claim 8, wherein the liquid is removed from the web by pressing and/or drying.

11. The method according to claim 8, wherein the resulting web is treated with heat to at least partially melt the plastic particles.

12. The method according to claim 8, wherein a liquid mixture containing water is formed.

13. The method according to claim 8, wherein the natural fibers are ground before forming the liquid mixture.

14. The method according to claim 8, wherein the natural fibers are cellulose fibers.

15. The method according to claim 8, further comprising adding at least one additive selected from the group consisting of starch, fillers, surface-active agents, retention agents, dispersing agents, anti-foam agents and mixtures thereof, to the liquid mixture.

16. The method according to claim 8, further comprising crushing the resulting web.

* * * * *